United States Patent [19]

Mahlein et al.

[11] Patent Number: 4,776,660

[45] Date of Patent: Oct. 11, 1988

[54] LIGHT DIPLEXER OF A COMMUNICATION SYSTEM COMPRISING THREE LIGHT CONNECTIONS

[75] Inventors: Hans F. Mahlein, Unterhaching; Herbert Michel, Munich; Achim Reichelt, Unterhaching; Gerhard Winzer, Putzbrunn, all of Fed. Rep. of Germany

[73] Assignee: Siemens Aktiengesellschaft, Berlin and Munich, Fed. Rep. of Germany

[21] Appl. No.: 7,285

[22] Filed: Jan. 27, 1987

[30] Foreign Application Priority Data

Jan. 31, 1986 [DE] Fed. Rep. of Germany ....... 3603023

[51] Int. Cl.$^4$ .......................... G02B 6/28; G02B 6/42
[52] U.S. Cl. .............................. 350/96.16; 350/96.15; 350/476
[58] Field of Search .................... 350/96.15, 96.16, 227

[56] References Cited

U.S. PATENT DOCUMENTS

| | | | |
|---|---|---|---|
| 3,953,727 | 4/1976 | d'Auria et al. | 250/199 |
| 4,165,496 | 8/1979 | Di Domenico, Jr. et al. | 350/96.15 |
| 4,317,699 | 3/1982 | Winzer et al. | 350/96.15 |
| 4,339,290 | 7/1982 | Winzer et al. | 350/96.16 |
| 4,343,532 | 8/1982 | Palmer | 350/96.16 |
| 4,439,005 | 3/1984 | Winzer | 350/96.15 |
| 4,541,159 | 5/1985 | Michel et al. | 350/96.15 |
| 4,549,782 | 10/1985 | Miller | 350/96.16 |
| 4,564,260 | 1/1986 | Dirmeyer et al. | 350/96.16 |
| 4,637,682 | 1/1987 | Mahlein et al. | 350/96.15 |
| 4,707,066 | 11/1987 | Falkenstein et al. | 350/96.20 |

FOREIGN PATENT DOCUMENTS

| | | |
|---|---|---|
| 137,485 | 4/1985 | European Pat. Off. . |
| 2903288 | 8/1979 | Fed. Rep. of Germany . |
| 2918403 | 11/1979 | Fed. Rep. of Germany . |
| 2851696 | 6/1980 | Fed. Rep. of Germany . |
| 2014752 | 8/1979 | United Kingdom . |
| 2020447 | 11/1979 | United Kingdom . |

OTHER PUBLICATIONS

Miyauchi et al, "Compact Wavelength Multiplexer Using Optical-Fiber Pieces", *Optics Letters*, vol. 5, No. 7, Jul. 1980, pp. 321–322.

Reichelt et al., "A Compact Three-Channel Module for Optical Wavelength Division Multiplexing", *ntz Archiv*, vol. 5, No. 4, 1983, pp. 97–99.

Winzer, "Wavelength Multiplexing Components-A Review of Single-Mode Devices and Their Applications", *Journal of Lightwave Technology*, vol. LT-2, No. 4, Aug. 1984, pp. 369–378.

Reichelt et al., "Wavelength-Division Multi Demultiplexers for Two-Channel Single-Mode Transmission Systems", *Journal of Lightwave Technology*, vol. LT-2, No. 5, Oct. 1984, pp. 675–681.

Rode et al, "Ein Rückstreuverfahren zur Untersuchung von Lichtleitfasern", *NTZ*, vol. 31, No. 2, 1978, pp. 144–146.

Winzer et al., "Single-Mode and Multimode All-Fiber Directional Couplers for WDM", *Applied Optics*, vol. 20, No. 18, Sep. 15, 1981, pp. 3128–3135.

Winzer, "What has WDM to Offer for Long-Haul (List continued on next page.)

*Primary Examiner*—Stanley D. Miller
*Assistant Examiner*—B. P. Davis
*Attorney, Agent, or Firm*—Hill, Van Santen, Steadman & Simpson

[57] ABSTRACT

A light branching element or diplexer comprising a first bi-directional light connection and a second and third unidirectional light connection. The unit is formed by a block having a straight surface groove with an embedded glass fiber which fiber is interrupted by a partially transmissive mirror lying on a slanting plane relative to the axis of the fiber. The light sensitive location of a light receiving semiconductor element is secured to the block adjacent to the mirror and the plane of the mirror is selected so that its normal extends out of the block at an angle of incidence smaller than 45° to the axis of the fiber to reduce reflections from the semiconductor member back to the mirror and into the fiber.

OTHER PUBLICATIONS

Single-Mode Fiber-Optic Links?", *Siemens Forsch. u. Entwickl.-Ber.*, vol. 12, No. 5, 1983, pp. 332–339.

Mahlein, "Fiber-Optic Communication in the Wavelength-Division Multiplex Mode", *Fiber and Integrated Optics*, vol. 4, No. 4, 1983, pp. 339–372.

Trimmel et al., "4-Channel WDM Transmission of 2×565 Mb/s Plus 2×140 Mb/s on a Single-Mode Fiber", *10th European Conf. on Opt. Commun. (ECOC) Stuttgart, Sep. 3–6, 1984/Conf. Proceed.*, pp. 262–263.

Tanaka et al., "The Development of Bidirectional-Wavelength-Multiplexing Integrated Module", *SPIE*, vol. 468, Fibre Optics '84 (Sira) 1984, pp. 68–73.

Winzer, "Wavelength Division Multiplexing-Status and Trends", European Conf. Opt. Commun. (ECOC), Cannes *Sep. 21–24, 1982/Conf. Proceed.*, pp. 305–314.

Winzer, "Principles of Wavelength Division Multiplexing", *Journees d' Electronique, Lausanne, 1982/Conf. Proceed.*, pp. 89–111.

Mahlein, "WDM Devices with Interference Filters", *6th European Conf. on Circ. Theories and Design, Stuttgart, Sep. 6–8, 1983/Conf. Proceed.*, pp. 315–317.

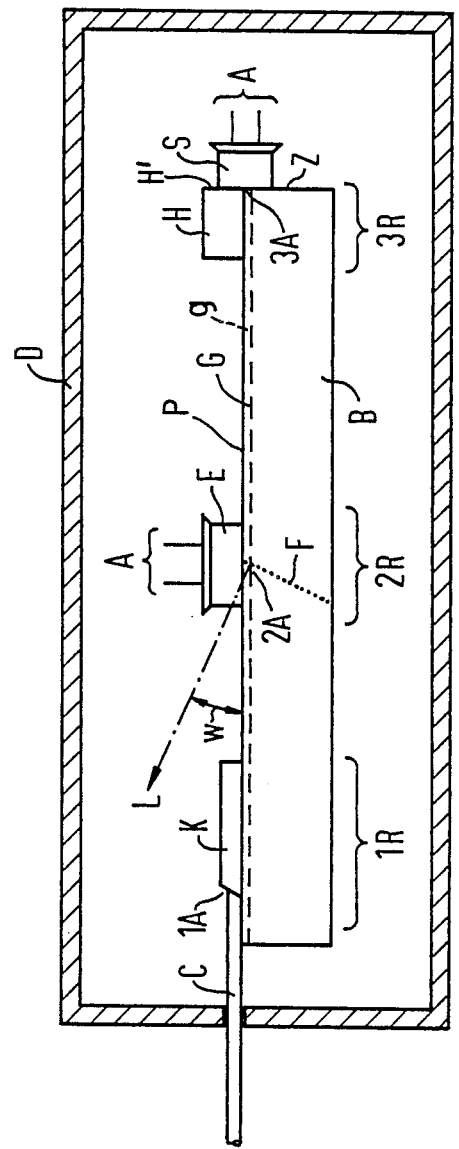

LIGHT DIPLEXER OF A COMMUNICATION SYSTEM COMPRISING THREE LIGHT CONNECTIONS

BACKGROUND OF THE INVENTION

The present invention relates to a special optoelectronic light branching element or diplexer for a multiplexdemultiplex modes which unit is required in some modern broad band communication systems, particularly in great numbers. The invention is directed to a specific light branching unit which has a first light connection that is bidirectionally operated and second and third light connections which are each unidirectionally operated, the unit is composed of a solid block of glass having a straight groove along the surface in which a glass fiber which has three glass fiber regions is embedded as a light waveguide, a first light connection is optically coupled to the first glass fiber region and a third light connection is connected to the third fiber region. At the second fiber region, which extends between the first and third regions, the embedded glass fiber is separated by a partially transmitting mirror which extends in a plane obliquely relative to the glass fiber axis and the block and forms a second light connection at which a perpendicular to the plane of the mirror forms an acute angle of incidence with the axis of the neighboring glass fiber coming from the first connection. A light sensitive location of a light receiving semiconductor unit is secured on the block in the second glass fiber region close to the second light connection without the insertion of any additional glass fibers extending from a gap to the light sensitive location. The mirror is a light waveguide filter such as a vapor deposit layer which preferably reflects light of a first light wavelength to a receiving portion or location of the light receiving semiconductor unit while allowing light of a second light wave length to pass therethrough so that light can move between the first and third light connections.

A light diplexer unit, or branching unit, which has a light reflecting surface for a particular light wavelength is disclosed in U.S. Pat. No. 4,439,005, which claims priority from German Patent Application No. 28 40 602. This unit comprises a circular segment in cross-section and has a long tubular metal sleeve as a capsule. In addition to an electrical light receiving semiconductor element or member, two purely optical connections are also applied to the three light connections so that the light reception semiconductor member is attached in the wall of the capsule. According to this disclosure, the mirror is at an angle of 45°, or half of a right angle, relative to the axis of the fibers.

A few critical investigations of such a light diplexer have shown that at least for many applications they should be decidedly improved in at least two regards. The first of these is the manufacturing of the block as well as the capsule, and above all, the mounting of this block precisely in its rated position in a capsule as well as the fixing of the light reception semiconductor element proximate to the mirror on the block should be considerably simplified. The second improvement is that the disturbances, particularly echoes, of the electrical signals obtained at the light reception semiconductor element which strongly occur in a very unpleasant way with high modulation frequencies of the light formed by the fiber should be eliminated in an optimum, elegant and simple manner.

Together, these two disadvantages are the important prerequisites in order to be able to employ large item numbers of the light diplexer in, for example, an optoelectronic ISDN broad band switching system as an interface between a bi-directionally light-conducting exterior glass fiber connected to a first light connection on the one hand and the electronics on the other hand.

An extremely great number of light diplexer units which are similar in some respects are known. Examples of these are disclosed in U.S. Pat. No. 4,564,260, which claims priority from German Patent Application No. 29 21 035, particularly FIG. 2 of this patent; in article by Miyauchi et al, *Opt. Lett.*, Vol. 5, No. 7, July 1980, pages 321–322; and articles in *NtzArchiv*, Vol. 5, 1983, pages 97–99, particularly FIGS. 1 and 2, *J. of Lightwave Techn.*, Vol. LT-2, No. 4, August 1984, pages 369–378, particularly FIGS. 1(a) and 6, and *J. of Lightwave Techn.*, Vol. LT-2, No. 5, October 1984, pages 675–681.

All of these known light branching or diplexing units respectively comprise a capsule having pure optical elements at the light connections. In these known light diplexer units, namely the three external connections at the capsule are respectively only external glass fiber connections in that light is used therein as information carrier in a connecting path of the communication system up to the peripheral subscriber station. Such an operation of a connecting path, however, is frequently not favorable. Often, it requires too high a finemechanical and optical precise outlay, particularly in view of the many external glass fiber connections, namely not only at the information connection of the many light diplexer units, but also especially in the line sections, which are usually extremely numerous in such a communication system, particularly in a public switching system, between the light diplexer units and often several thousand subscriber stations. The invention should allow this outlay to be avoided.

It is known from various publications to make the mirror in the glass fiber or, respectively, in the block steeper than 45°. For example, an angle of incidence smaller than 45° in order to obtain an especially good optical coupling to an additional glass fiber whose axis describes an angle smaller than 90° with the axis of the embedded glass fiber. Examples of these are from European Application No. A 37 057, as well as U.S. Pat. No. 4,541,159, which claims priority from German Application No. 32 36 149.

A measuring instrument comprising light diplexer units for error location in long glass fibers is known from an article from ntz, Vol. 31, No. 2, February 1978, pages 144–146 which discloses a capsule-free light diplexer unit comprising one purely optical, one glass fiber connection and two electrical connections formed by a light transmission and a light reception semiconductor component at the second and third light connections. However, the light diplexer unit disclosed therein is too unwieldy for employment in large communication systems, especially when the numerous light diplexer units are to be accommodated in the tightest space in a common cabinet.

There is an extremely high number of additional references with respect to the technological background for light diplexer or branching units and opto-electronic communication systems. Examples of these are: U.S. Pat. No. 4,317,699, which is based on German Application No. P 28 51 679; German OS 28 51 696; German OS 29 03 288; German OS 29 18 403; U.S. Patent Application Ser. No. 246,100, which issued on Jan. 20, 1987 as U.S. Pat. No. 4,637,682 claims priority from German Patent Application No. 30 12 184; the above mentioned U.S. Pat. No. 4,541,159; British Patent No. 2,020,447; U.S. Pat. Nos. 3,953,727; and 4,165,496; an article from Appl Opt., Vol. 20, No. 18, 15 September, 1981, pages 3128–3135, particularly FIGS. 1, 5 and 9; an article from *Siemens Forsch. u. Entw.-Ber.*, Vol. 12, No. 5, 1983, pages 332–339, particularly FIG. 2; an article from *Fiber and Integr Opt.*, Vol. 4, No. 4, 1983, pages 339–372, particularly FIGS. 2, 18, 9 and 17; a paper from 10*th European Conference on Opt. Commun. (ECOC), Stuttgart, 3–6 September, 1984/Conference Proceeding*, pages 262–263, particularly FIG. 2; an article from *SPIE 468 Fiber Optics '84 (SIRA)*, 1984, pages 68–73, particularly FIGS. 4 and 8; a paper from *European Conference of Opt. Commun. (ECOC), Cannes, 21–24 September 1983/Conference Proceedings*, pages 305–314, particularly FIGS. 4 and 7; a paper from *Journees d' Electronique, Lausanne, 1982/Conference Proceedings*, pages 89–111, particularly FIGS. 1(c), 12, 14(a,b,c) and 19; a paper from 6*th European Conference on Circ. Theories and Design, Stuttgart, 6–8 September 1983/Conference Proceedings*, pages 315–317, particularly FIGS. 6 and 7; and a paper from *U.R.S.I., Kleinheubacher Tagung, 3–7 October 1983/Kleinheubacher Berichte*, No. 27, pages 13–29, particularly FIGS. 1 and 5(b).

Detailed teachings regarding the manufacture of light diplexer or branching units, particularly with regard to the blocks and mirrors, are contained in several of the above-mentioned publications.

Moreover, light receiver semiconductor members, for example photodiodes, and light transmitting semiconductor members, for example, IRED diodes, are extremely well known to a person skilled in the art. Many references also disclose that the ends of glass fiber light lines might frequently be directed with extreme precision to the optically active location of such a semiconductor element with a long-term stability, frequently even with extremely high tolerances of plus or minus a few $\mu$m, sometimes of even plus or minus 0.1 $\mu$m, in order to achieve good optical coupling therewith. An example is from the European Application No. A 137 485.

SUMMARY OF THE INVENTION

It is an object of the present invention to provide an easily manipulatable solution, for example for a multiplexdemultiplex application in many such communication systems, which is advantageously optimally uninvolved and compact and which, namely comprise the following structural features and advantages:

comprises at least one electrical connection at a second light connection, this electrical connection allowing the light diplexer to be connected via electrical current as information carriers to a subscriber station receiving the electrical signals, being connected thereto, for example, via coaxial cables;

greatly diminishes the echo-like disturbances which can occur due to light reflections at a surface of the light receiving semiconductor component in that the light reflected there should no longer be reflected via the mirror back into the optical fiber insofar as possible;

requires especially little outlay for the manufacture of the light diplexer unit itself;

requires little fine mechanical and optical outlay, even in view of the light fiber plugs and adjustment in mountings in a capsule;

respectively avoids light fiber regions at least at the second and third light connection, which regions are referred to as pigtails and respectively project from the block, are sensitive to impact, are difficult to adjust and are spacewasting; and allows a good optical coupling out of the block toward the outside at all light connections of the block.

To accomplish these objects, the present invention is directed to an improvement in a light diplexer or branching unit of a communication system comprising a first light connection being bi-directionally operated, and second and third light connections each being uni-directionally operated; a solid block for example, composed of glass comprising a straight groove along the surface in which the a glass fiber comprising the three light fiber regions is embedded and secured, for example by glue as a light line; first means for forming a first light connection being optically coupled to the first fiber region and third means for forming a third light connection being optically coupled to the third fiber region, a second fiber region between the first and third fiber regions, the embedded glass fiber having a partially transmitting mirror lying in a plane obliquely relative to the glass fiber axis, said mirror extending through the fiber and portions of the adjacent block and forming second means for forming said second light connection, said mirror having a plane with a normal extending out of the block and describing an acute angle of incidence with a glass fiber axis extending to the first light connection, a light sensitive portion of a light receiving semiconductor member being secured on the block in the second glass fiber region, namely, close to the second light connection without insertion of additional glass fibers extending from a gap to the light sensitive location; said mirror being a light waveguide filter, for example a vapor deposited layer for reflecting light of a first light wavelength out of the glass fiber into a light-sensitive location of the light receiving semiconductor member, but at least largely allowing light of the second light wavelength band coming from the third light connection to pass through to the first light connection. The improvements are that the groove is applied in a planar block surface of a more or less cubic block and the angle of incidence between the fiber and the mirror is less than 45°.

In the invention, the application of the embedded, single glass fiber in a block surface requires especially small outlays. The manufacturing of the block comprising planar surfaces, as well as the fastening of the glass fiber in the groove, as well as the manufacture of the appropriately slanted mirror are thus respectively possible in a way known per se.

In addition, at least the second means and the second light connection are fashioned as opto-electronic connection, which has as low-reflection as possible and is coupled optically well with long-term stability, can be easily adjusted, and can be easily manipulated so that the optical sensitive location of the light receiving semiconductor member or element therein for example, a photodiode housing is directly secured to the block above the mirror of the glass fiber in a way involving particularly small outlays, for example, by being glued gap-free insofar as possible. It has been demonstrated, namely, that the echo-like disturbances are produced by reflections at the surface of the light receiving semiconductor member. In order to suppress the echo-causing reflections at the surface of the light receiving semiconductor member, the angle of incidence is therefore made less than 45°, even though the surface of the light receiving semiconductor component lies parallel to the axis of the glass fiber. Thus, as a result, the reflections at the surface of the semiconductor member are not reflected back into the glass fiber via the mirror and are not reflected back at all. The invention thereby also utilizes the fact that the light impinging on the surface of the light receiving semiconductor member or body is at more or less of a slant instead of a perpendicular and is likewise converted into an electrical signal by this component, usually with rather a good efficiency.

As needed, a light wavelength filter, like an optical antireflection layer on a lens, which does not block only the first light wavelength, can be additionally inserted between the block and the light receiving semiconductor body for additional, further suppression of such disturbing reflections.

The cuboid form for the block also greatly facilitates both the assembly of the light diplexer component parts to form the unit of the invention as well as the mounting of the light diplexer unit in a capsule as needed. Thus, the capsule can comprise an extremely simple format, for example, a simple form like a box.

There are several possibilities for fastening the light receiving semiconductor member to the completely manufactured block comprising the glass fibers and the mirror in a fashion that is stable over the long term. For example, the block can be secured by itself in a capsule, for example, can be clamped or glued, and an adjustable pedestal displaceable in the capsule to which the appertaining semiconductor member is secured can be applied. Thus, the semiconductor member is adjustable at the light connection and can be pressed against the block. Then it is finally fastened, for example, by locking the adjustment pedestal.

In addition to fastening by means of such a pedestal or instead of such a fastening by means of a pedestal, the semiconductor member itself can be bonded or, respectively, glued to the block, for example, free of air gaps, in its adjusted position instead of only pressing it against the block. The fastening is then secured especially well against impact and vibrations, for example, and it is secured in an especially longterm stable fashion with respect to the quality of the optical coupling.

In addition, the light diplexing unit can also be mounted in such a fashion that the light receiving semiconductor member is first secured to the block which already contains the glass fiber and the mirror and is secured, for example, by adhesive, gluing or clamping. The light diplexer unit finished in this way is not subsequently secured in a capsule until needed insofar as there is no preference to use without a capsule at all.

Moreover, a separate housing for the light receiving semiconductor member can also be frequently omitted without obtaining inadmissibly high-frequency couplings, particularly when the entire light diplexer unit together with its light receiving semiconductor member is surrounded with an electrically conductive capsule, for example, a capsule shielding electrically high-frequency oscillations. With especially little outlay, the appertaining, bare, housing-free light receiving semiconductor member, perhaps protected only by a lacquer, is then placed in the capsule on the second light connection of the block and is secured, for example by glue, in this position.

Additional structure provides additional advantages. For example, if the angle of incidence amounts to about 35°, it provides the advantage of allowing a certain optimumization to be achieved wherein the reflections at the surface of the light receiving semiconductor member are correspondingly reduced, and wherein the light is converted into electrical signals with good efficiency in the light receiving semiconductor member despite the angle of incidence selected.

If the structure provides an external light wavelength filter, which attenuates and/or reflects light of a first light wavelength range as little as possible but attenuates and/or reflects light of the second light wavelength range as greatly as possible is inserted in the second glass fiber region between the glass fiber surface and the light receiving semiconductor member, this will allow the disturbing reflections of the light of the first light wavelength range to be further reduced at the surface of the light receiving semiconductor member.

If a light transmission semiconductor member capable of emitting light is secured to the third light wave connection which is formed at an obtuse end of the glass fiber and aligned with the end surface of the block at the end of the third glass fiber region and the semiconductor member being aligned secured thereto without the insertion of glass fibers between the block and the location of emitting light. This will allow the light diplexer unit to be directly operated as a hybrid set or connection between an external glass fiber bi-directionally operated in a purely optical fashion and two semiconductor members of the communication system which are opto-electronically operated unidirectionally.

If, when utilizing this additional semiconductor light transmitting member, a fixed cover having a planar end surface which is directed towards the light transmission semiconductor member and is secured on the block surface in the third glass fiber range with its end surface as a continuation of the block surface to provide a mounting surface for this additional semiconductor transmitting member, this will allow an especially stable, impact resistant fastening of the light transmission semiconductor member at the block to be achieved.

If a prism for coupling light out of the first glass fiber region and for coupling light into the first glass fiber region is secured on the groove in the first glass fiber region, then a good optical coupling between the external glass fiber and the first light connection is provided in a simple way after complete manufacture of the light diplexer unit.

Preferably, an external glass fiber is connected in the first fiber connection and has its end coupled to this end. This external glass fiber will either be coupled directly aligned to the glass fiber of the block or have its fiber extend parallel to the glass fiber of the block and is connected by the prism.

If the embedded glass fiber of the block emerges gap-free and is connected with a gap-free connection to the external glass fiber aligned with respect to this fiber, then this provides a simple, prism-free optical coupling between an external glass fiber and the glass fiber embedded in the block to be achieved.

If the block and at least parts of the semiconductor members are enclosed in a capsule which is at least largely light-tight, then a protection of the light diplexer unit against damage as well as against optical coupling and against electrical coupling as needed to the arbitrary members of the environment which are not to be coupled can be achieved.

Other advantages will be obvious in view of the following description and drawings.

BRIEF DESCRIPTION OF THE DRAWINGS

The Figure is a side view with portions in elevation of an opto-electronic ISDN switching system in accordance with the present invention.

DESCRIPTION OF THE PREFERED EMBODIMENTS

The principals of the present invention are particularly useful in a branching unit or light diplexer unit illustrated in the drawing. The diplexer has a block B with a planar or upper surface P and an end surface Z. The block, which is composed for example of glass or of a semiconductor material, has a straight groove G in its upper surface P in which a glass fiber g comprising three glass fiber regions 1R, 2R and 3R is embedded and secured, for example by glue, to form a light conductor. In the illustrated example, the depth of the groove G is about the same as the thickness of the glass fiber g and both the groove G, as well as the glass fiber g are thereby so thin that the figure does not show a distinction therebetween.

The unit includes first means forming a light connection 1A, second means forming a light connection 2A and third means forming a light connection 3A. In addition, the unit has two semiconductor members E and S, which are secured to the block. The semiconductor member E is a light receiving semiconductor member which converts light of a first light wavelength range or band into electrical signals which will appear at its connections or leads A. This semiconductor member E is connected to the upper surface P of the block B at the second means or second light connection 2A. The other semiconductor member S is a light transmitting semiconductor member or unit which will send light of a second light wavelength range or band which is connected to the block at the third means or third light connection 3A and will send light through the embedded glass fiber g as soon as its leads A have been supplied with appropriate electrical signals.

In the figure, the first means or first light connection 1A is operated in an optical bi-directional manner. The second and third light connections 2A and 3A each are operated as an opto-electronically and are uni-directional.

The first light wave connection 1A is optically connected to the first glass fiber region 1R and the third light connection 3A is optically coupled to the third glass fiber region 3R. In the second glass fiber region 2R lying between the first region 1R and the third glass fiber region 3R, the embedded glass fiber g has a mirror lying obliquely relative to the axis of the glass fiber and serves as the second light connection 2A. The mirror has a plane F with a normal or perpendicular L which extends out of the block and forms an acute angle of incidence w with the neighboring glass fiber axis which extends between the first light connection 1A and the second light connection 2A. For this purpose, the block together with the embedded glass fiber g was cut on the plane F in accordance with the selected angle of incidence w and the surfaces were then appropriately polished and provided with a mirror and the block parts then reassembled and rejoined, for example by gluing together, to form the block B shown in the figure.

The light sensitive location or area of the light receiving semiconductor member E is secured on the surface P of the block B in the second glass fiber region 2R, namely close above the second light connection 2A. This securing involves an especially small cost because it does not require the insertion of additional glass fibers between the mirror of the connection 2A to the light-sensitive location.

In forming the mirror, it can be formed as a light wavelength filter, for example by an appropriate depositing of multi-layers to lie in the plane F. This filter selectively reflects light of a first wavelength range or band coming from the first light connection 1A, largely out of the glass fiber g into the light sensitive location of the light receiving semiconductor member E. However, the filter at least largely allows light of a second, different light wavelength range or band coming from the third light connection 3A to pass to the first light connection 1A.

As mentioned, the groove G is formed in the planar upper surface P of the block B which is a cuboid. As already indicated, the block B and its groove G can therefore be manufactured in an especially easy way, and moreover, the block can also be easily secured in a solid way because of its simple cuboid shape. For example, if it is secured on a planar inside surface of box-shaped capsule B.

The mirror is oriented in the block B at an angle of incidence w which is less than 45° so that the light reflected by the mirror from the glass fiber g does not, as already mentioned, impinge on the surface of the light receiving semiconductor member E perpendicularly, but at a slant. As likewise already mentioned, an echo-like disturbance due to reflection of the light from this light receiving surface of the member E back to the first light connection 1A via the mirror is already largely suppressed. The light receiving semiconductor member E also continues to exhibit good efficiency for the conversion of the received light into electrical signals despite the light incidence which is slanted for it, however, if the light incidence is not too exceedingly oblique, the functionability of this member E has remained adequate despite the high degree of suppression of the echo causing reflections. The optimum angle of incidence w differs in accordance with the type of member E and can be easily identified by trial and error. For example, it amounts to about 35°. Moreover, the edge of the filter characteristic can be made considerably steeper by such a selection of the angle of incidence in comparison to a mirror having a 45° angle to the axis of the fiber g.

For even better suppression of the disturbing reflections, a light wave filter, which attenuates and/or reflects light of the first light wavelength range as little as possible, but attenuates and reflects of the second light wavelength region as greatly as possible can be inserted in the second glass fiber region 2A between the glass fiber surface g and the light receiving semiconductor member E. Thus, this additional filter will pass the light of the first wavelength range while attenuating and/or reflecting light of the second range.

The light transmitting semiconductor member S, for example a GaAs laser S, which is capable of emitting light can be secured to the third light connection 3A which is formed by an obtuse end of the glass fiber g at third glass fiber region 3R that is aligned with a neighboring block end surface Z. Again, this connection can be made with little outlay without inserting an additional glass fiber having a glass fiber axis direction between the block B and the location capable of emitting the light.

As illustrated, the solid cover H, which has a planar end surface H', is mounted on the upper surface P to cover the groove G and with its end surface H' directed towards the semiconductor element or member S and aligned to lie in the same plane as the end surface Z of the block. The combination of the end surfaces H' and Z form a mounting surface on which the member S can be adjusted and secured in an especially easy and solid manner.

As also illustrated in the drawing, a prism K for facilitating the out-coupling of light from the first glass fiber region 1R and for facilitating the in-coupling of light into the first glass fiber region 1R can be secured to cover the groove G in first glass fiber region 1R in a way known per se. The first light connection 1A can then be optically coupled to an end of an external glass fiber C with little cost. The glass fiber axis of the fiber C lies at least largely parallel to the glass fiber axis of the embedded glass fiber g in the immediate proximity of the block.

The glass fiber axis of the external glass fiber C can even be aligned with the glass fiber axis of the embedded fiber g when the embedded fiber g merges gap-free into the external glass fiber C which is aligned with respect to its glass fiber axis. In this modification of the invention, the embedded glass fiber g and the external glass fiber C aligned thereto are composed of a single glass fiber that extends out of the block as the external glass fiber C. In this arrangement, the prism K can therefore be eliminated.

As already stated, the block B, if not at least a part of the semiconductor members E and S as well can be enclosed in a capsule D which is at least largely light-tight. When this capsule D is also composed of electrically conductive material, disturbing, electrical high-frequency couplings between the members E and S on the one hand and externally applied, further electrical components on the other hand can be correspondingly avoided.

Although various minor modifications may be suggested by those versed in the art, it should be understood that we wish to embody within the scope of the patent granted hereon all such modifications as reasonably and properly come within the scope of our contribution to the art.

We claim:

1. In a light diplexer unit for a communication system, said diplexer including a solid block having a straight groove containing a glass fiber to provide first, second and third glass fiber regions, a first means for forming a first light connection for coupling light to the fiber at the first glass fiber region, a third means for forming a third light connection for optically coupling to the glass fiber in the third glass fiber region, said second glass fiber region being positioned between the first and third glass fiber regions and including a partially light transmitting mirror having a plane extending obliquely relative to the axis of the glass fiber to form second means which forms a second light connection, said plane having a normal extending out of the block and forming an acute angle of incidence with the axis of the neighboring glass fiber extending towards the first means, a light receiving semiconductor member having a light-sensitive location being secured on the block in the second glass fiber region close to the second light connection to receive light from said second connection without any additional glass fibers extending from the second connection to the light sensitive location, said mirror including a light wavelength filter of a plurality of vapor deposited layers for reflecting light of a first range of light wavelengths out of the fiber onto the light sensitive location of the light receiving semiconductor member while transmitting light of a second range of light wavelengths coupled into the glass fiber at the third light connection to pass to the first light connection, the improvements comprising the groove being applied in a planar block surface of a cuboid block and the angle of incidence being less than 45°.

2. In a light diplexer according to claim 1, wherein the angle of incidence amounts to approximately 35°.

3. In a light diplexer according to claim 2, wherein additional light waveguide filter which attenuates and/or reflects light of the first range of light wavelengths as little as possible and attenuates and/or reflects light of the second range of light wavelengths is inserted in the second glass fiber region between the surface of glass fiber and the light receiving location of the semiconductor member.

4. In a light diplexer according to claim 1, wherein a light transmitting semiconductor member having a location capable of emitting light is secured to the third light connection which is formed by an obtuse end of the glass fiber and aligned with an end surface of the block at the end of the third glass fiber region, said light transmitting semiconductor member being secured thereto without the insertion of any additional glass fibers between the block and a location capable of emitting light.

5. In a light diplexer according to claim 4, which includes a cover having a planar end surface lying in a plane of the end surface of the block as said cover covers a portion of the groove in a third glass fiber region, said light transmitting semiconductor member being secured to the end surfaces of the block and said cover.

6. In a light diplexer according to claim 1, wherein the first light connection includes a prism for coupling light out of the first glass fiber region and for coupling light into the first glass fiber region being secured on the groove at the first glass fiber region.

7. In a light diplexer according to claim 6, wherein an external glass fiber is optically coupled to said prism. said external glass fiber extending parallel to the fiber in said groove adjacent to said prism.

8. In a light diplexer according to claim 1, wherein an external glass fiber is optically connected to the end of the glass fiber of said block at said first light connection, said external glass fiber extending parallel to the glass fiber axis of the glass fiber immediately approximate to the first glass fiber region and being axially aligned therewith.

9. In a light diplexer according to claim 8, wherein the embedded glass fiber of the block and the external glass fiber aligned therewith are formed by a single continuous glass fiber.

10. In a light diplexer according to claim 1, wherein at least the block and parts of each of the semiconductor members are enclosed in a capsule which is at least largely light-tight.

11. A light diplexer according to claim 1, which includes an external light waveguide filter which attenuates and/or reflects light of the first range of light wavelengths as little a possible while attenuating and reflecting light of the second range of light waveguides, said filter being provided in the second glass fiber range and extending between a glass fiber surface and a light receiving surface of the semiconductor element.

12. In a light diplexer unit for a communication system, said diplexer including a solid block having a straight groove containing a glass fiber to provide first, second and third glass fiber regions, a first means for forming a first light connection for coupling light to the fiber at the first glass fiber region, a third means for forming a third light connection for optically coupling to the glass fiber in the third glass fiber region, said second glass fiber region being positioned between the first and third glass fiber regions and including a partially light transmitting mirror having a plane extending obliquely relative to the axis of the glass fiber to form second means which forms a second light connection, said plane having a normal extending out of the block and forming an acute angle of incidence with the axis of the neighboring glass fiber extending towards the first means, a light receiving semiconductor member having a light-sensitive location being secured on the block in the second glass fiber region close to the second light connection to receive light from said second connection without any additional glass fibers extending from the second connection to the light sensitive location, said mirror including a light wavelength filter of a plurality of vapor deposited layers for reflecting light of a first range of light wavelenghs out of the fiber onto the light sensitive location of the light receiving semiconductor member while transmitting light of a second range of light wavelengths coupled into the glass fiber at the third light connection to pass to the first light connection, the improvements comprising the groove being applied in a planar block surface of a cuboid block and said second means including means for reducing echo-like disturbances at the light sensitive location and comprising the angle of incidence being less than 45° so that light reflected at the light sensitive location will be directed away from the mirror.

* * * * *